US009202258B2

(12) United States Patent
Greisen et al.

(10) Patent No.: US 9,202,258 B2
(45) Date of Patent: Dec. 1, 2015

(54) VIDEO RETARGETING USING CONTENT-DEPENDENT SCALING VECTORS

(71) Applicant: Disney Enterprises, Inc., Burbank, CA (US)

(72) Inventors: Pierre Greisen, Zurich (CH); Aljosa Aleksej Andrej Smolic, Zurich (CH); Simon Heinzle, Zurich (CH); Manuel Lang, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 392 days.

(21) Appl. No.: 13/654,354

(22) Filed: Oct. 17, 2012

(65) Prior Publication Data
US 2013/0342758 A1    Dec. 26, 2013

Related U.S. Application Data

(60) Provisional application No. 61/662,317, filed on Jun. 20, 2012.

(51) Int. Cl.
*G06T 3/00*    (2006.01)
(52) U.S. Cl.
CPC .................................. *G06T 3/0012* (2013.01)
(58) Field of Classification Search
CPC ............................... H04N 7/01; G06T 3/0012
USPC ..................... 345/441; 348/E7.003
See application file for complete search history.

(56) References Cited

U.S. PATENT DOCUMENTS

| 8,483,513 B2* | 7/2013 | Liang | 382/298 |
| 2002/0154833 A1* | 10/2002 | Koch et al. | 382/325 |
| 2008/0025639 A1* | 1/2008 | Widdowson et al. | 382/284 |
| 2011/0069224 A1* | 3/2011 | Gross et al. | 348/441 |

(Continued)

FOREIGN PATENT DOCUMENTS

WO    WO 2011121563 A1 * 10/2011

OTHER PUBLICATIONS

Chenlei Guo et al., Spatio-temporal Saliency Detection Using Phase Spectrum of Quaternion Fourier Transform.
(Continued)

*Primary Examiner* — Stephen R Koziol
*Assistant Examiner* — Brian Kravitz
(74) *Attorney, Agent, or Firm* — Patterson + Sheridan, LLP (57) ABSTRACT

Techniques are disclosed for retargeting images. The techniques include receiving one or more input images, computing a two-dimensional saliency map based on the input images in order to determine one or more visually important features associated with the input images, projecting the saliency map horizontally and vertically to create at least one of a horizontal and vertical saliency profile, and scaling at least one of the horizontal and vertical saliency profiles. The techniques further include creating an output image based on the scaled saliency profiles. Low saliency areas are scaled non-uniformly while high saliency areas are scaled uniformly. Temporal stability is achieved by filtering the horizontal resampling pattern and the vertical resampling pattern over time. Image retargeting is achieved with greater efficiency and lower compute power, resulting in a retargeting architecture that may be implemented in a circuit suitable for mobile applications such as mobile phones and tablet computers.

20 Claims, 7 Drawing Sheets

(56) References Cited

U.S. PATENT DOCUMENTS

| | | | | |
|---|---|---|---|---|
| 2011/0109720 | A1* | 5/2011 | Smolic et al. | 348/43 |
| 2011/0182502 | A1* | 7/2011 | Liang | 382/162 |
| 2011/0194024 | A1* | 8/2011 | Stefanoski et al. | 348/441 |
| 2011/0235910 | A1* | 9/2011 | Soceanu et al. | 382/173 |
| 2011/0268179 | A1* | 11/2011 | Diggins et al. | 375/240.02 |
| 2012/0007960 | A1* | 1/2012 | Kim et al. | 348/51 |
| 2012/0120311 | A1* | 5/2012 | De Haan | 348/441 |
| 2013/0124532 | A1* | 5/2013 | McQuarrie | 707/748 |
| 2013/0251207 | A1* | 9/2013 | Mukhopadhyay et al. | 382/103 |

OTHER PUBLICATIONS

Pierre Greisen, Michael Schaffner et al., Analysis and VLSI Implementation of EWA Rendering for Real-Time HD Video Applications.
Siddhartha Chatterjee, Sandeep Sen, Cache-Efficient Matrix Transposition.
Sungmin Bae, Yong Cheol Peter Cho, Sungho Park et al., An FPGA implementation of Information Theoretic Visual-Saliency System and Its Optimization.
Judd Ehinger Durand and Torralba, Learning to Predict Where Humans Look.
Jun-Seong Kim, Seong-Gyun Jeong et al, Content-Aware Image and Video Resizing Based on Frequency Domain Analysis.
Hendrik Knoche et al., The Kindest Cut: Enhancing the User Experience of MobileTV through Adequate Zooming.
Philipp Krahenbuhl Manuel Lang, A System for Retargeting of Streaming Video.
Rubenstein Gutierrez Sorkine and Shamir, A Comparative Study of Image Retargeting.
Rubenstein Shamir and Avidan, Improved Seam Carving for Video Retargeting.
Rubenstein Shamir and Avidan, Multi-operator Media Retargeting.
Setlur Takagi Raskar et al, Automatic Image Retargeting.
Liang Shi,Jinqiao Wang,Ling-yu Duan, Hanqing Lu, Consumer Video Retargeting: Context Assisted Spatial-temporal Grid Optimization.
Wang Fu Sorkine et al, Motion-Aware Temporal Coherence for Video Resizing.
Lior Wolf, Moshe Guttmann, Daniel Cohen-Or, Non-homogeneous Content-driven Video-Retargeting.
Wang Lin Sorkine and Lee, Motion-based Video Retargeting with Optimized Crop-and-Warp.
Wang Stefanoski Land et al, Extending SVC by Content-Adaptive Spatial Scalability.
Wang Tai Sorkine and Lee, Optimized Scale-and-Stretch for Image Resizing.
Wang Hsiao Sorkine and Lee, Scalable and Coherent Video Resizing with Per-Frame Optimization.
Zhang Hu and Martin, Shrinkability Maps for Content-Aware Video Resizing.
Zwicker and Pfister, EWA Splatting.
Tilke Judd et al., Fixations on low-resolution images.
Lang et al. Practical Temporal Consistency for Image-Based Graphics Applications.
Daniele Panozzo et al. Robust Image Retargeting via Axis-Aligned Deformation.
Daniele Panozzo et al. Robust Image Retargeting via Axis-Aligned Deformation (Supplemental Material).
Pierre Greisen et al. "Algorithm and VLSI architecture for real-time 1080p60 video retargeting" 2012,EGGH-HPG' 12 Proceedings of the Fourth ACM SIGGRAPH/Eurographics conference on High-Performance Graphics. pp. 57-66.

* cited by examiner

VIDEO RETARGETING USING CONTENT-DEPENDENT SCALING VECTORS

CROSS-REFERENCE TO RELATED APPLICATIONS

This application claims the priority benefit of provisional U.S. patent application entitled "HARDWARE-EFFICIENT REAL-TIME HD VIDEO RETARGETING," Ser. No. 61/662,317, filed Jun. 20, 2012, hereby incorporated herein by reference.

BACKGROUND OF THE INVENTION

1. Field of the Invention

The present invention relates generally to the field of video processing and, more specifically, to video retargeting using content-dependent scaling vectors.

2. Description of the Related Art

Presently, display systems for video content present a variety of different formats. Where a video format includes video stream characteristics such as the video's image resolution (image width and image height in pixels) and the video's image aspect ratio (image width divided by the image height). However, the original video content is typically produced in a single format. Certain video formats targeted for television broadcast or cinematic presentation are fairly standardized. However, the proliferation of handheld devices such as tablet computers and mobile phones has resulted in display systems with display formats that are significantly different from the original video formats.

In order for video produced in one format to be displayed on a device with a different display format, the video is retargeted from the original video format to the target device's display format. Specifically, with regards to the video image resolution, such retargeting is accomplished through linear scaling or letter-boxing. With linear scaling, the original video image is linearly scaled in the horizontal and vertical dimensions to fit the target display resolution. With such an approach, the horizontal scaling is performed separately from the vertical scaling. Where the aspect ratio of the original video is significantly different from the target aspect ratio of the display device, linear scaling distorts the original video, causing a perceptually unpleasant viewing experience. With letter-boxing, the original video image is proportionally scaled to preserve the original aspect ratio of the original video image on the target display device. Black bars are presented on the top and bottom or on the left and right of the display device to account for the difference in resolution between the target display resolution and the retargeted image resolution. However, when using letter-boxing, the maximum usable area of the display is not utilized, which is particularly problematic for smaller display devices.

SUMMARY OF THE INVENTION

One embodiment of the present invention includes a computationally efficient approach for non-linear video warping (retargeting) in end-user devices. This retargeting approach achieves quality results at much lower computational complexity. Based on this approach, an efficient hardware architecture for mobile devices may be implemented. Such a hardware architecture may be able to retarget high-definition (HD) video content in real time, with modest hardware cost and using low processor clock speeds.

One embodiment of the present invention includes a method for retargeting an input image. The method includes receiving an input image comprising a plurality of picture elements (pixels) or a plurality of pixel groups (super-pixels or clusters comprising one or more pixels), and computing a two-dimensional (2D) saliency map based on at least a portion of the input image. The method further includes projecting the two-dimensional saliency map in at least one of a first direction to create a horizontal saliency profile and a second direction to create a vertical saliency profile. The method further includes scaling at least one of the horizontal saliency profile and the vertical saliency profile to create at least one of a scaled horizontal saliency profile and a scaled vertical saliency profile. The method further includes creating an output image based on at the least one of the scaled horizontal saliency profile the scaled vertical saliency profile.

Other embodiments include, without limitation, a computer-readable storage medium that includes instructions that enable a processing unit to implement one or more aspects of the disclosed methods as well as a computing system configured to implement one or more aspects of the disclosed methods.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention involve efficiently retargeting video from one image resolution to another preserving the aspect ratio of salient image regions while distorting the aspect ratio of the other image regions. A scaling vector is computed in the vertical and horizontal directions, where the scaling vector is equal to 1 in those salient areas of the image that are to be preserved. The scaling vector for the other regions is <1 in the case of minifications, and >1 in the case of magnifications. The set of scaling vectors for an image are non-linear scaling vectors in that the cumulative sum of these scaling vectors may form a non-uniform resampling grid used for the rendering of the target image from the original image.

In one embodiment, video targeting is efficiently performed in real time, even for video images at high definition (HD) resolution. As a result, visually pleasing retargeting of HD video is possible using less expensive and smaller components relative to current techniques.

Hardware Overview

Figure 1:
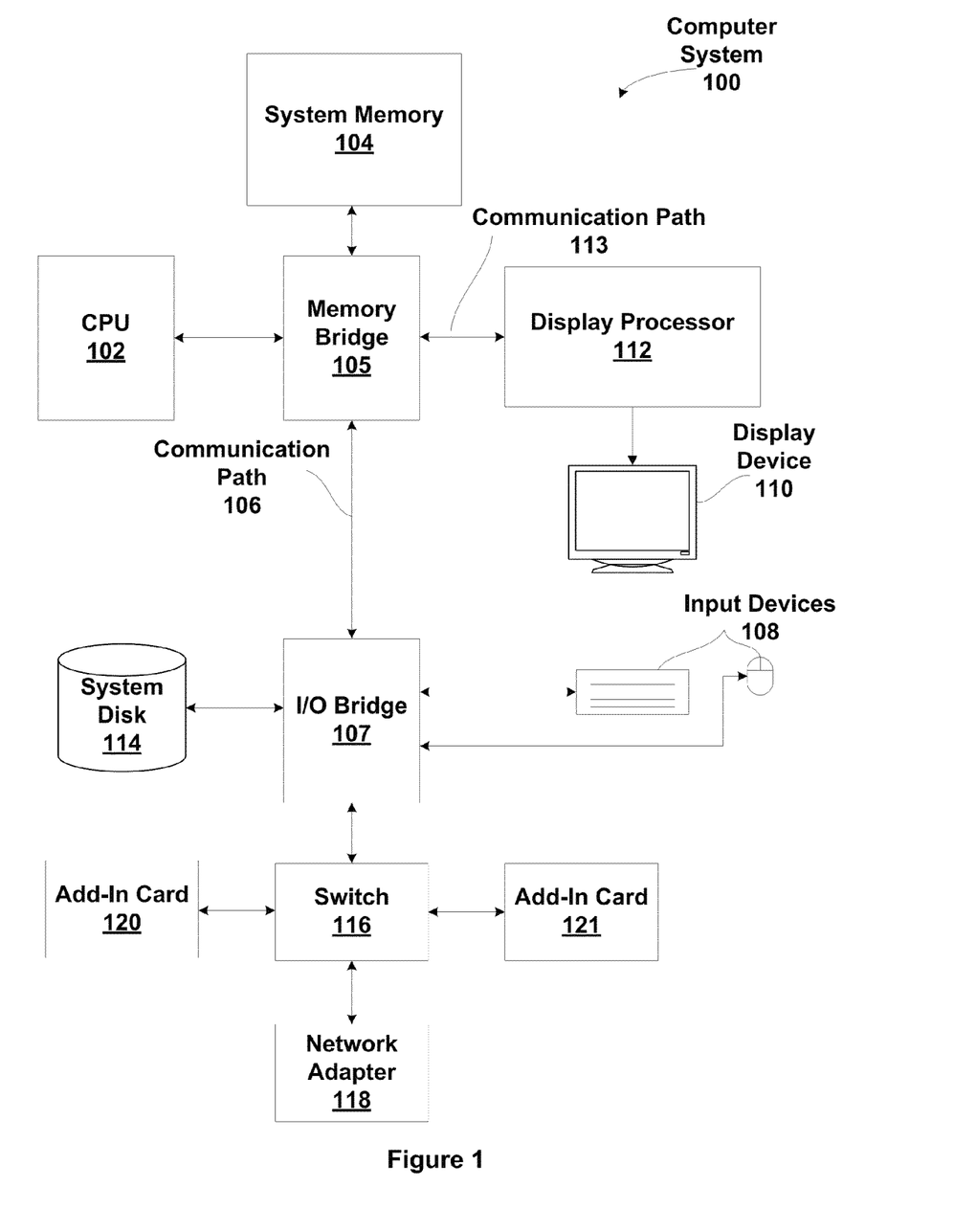
FIG. 1 depicts one architecture of a system, according to one embodiment of the present invention.

FIG. 1 depicts one architecture of a system 100, according to one embodiment of the present invention. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and microphones) and forwards the input to CPU 102 via memory bridge 105.

A display processor 112 is coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, BLU-RAY, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and data representing a scene are provided to a render farm or a set of server computers, each similar to system 100, via network adapter 118 or system disk 114. The render farm generates one or more rendered images of the scene using the provided instructions and data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and instructions defining the desired output images, from which display processor 112 generates the pixel data of one or more output images, including characterizing and adjusting the offset between stereo image pairs. The data and instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and camera parameters for a scene. Display processor 112 can further include one or more programmable execution units capable of executing shader programs, tone mapping programs, and the like.

The CPU 102, render farm, or display processor 112 can employ any surface or volume rendering technique known in the art to create one or more rendered images from the provided data and instructions, including, without limitation, rasterization, scanline rendering REYES or micropolygon rendering, ray casting, ray tracing, image-based rendering techniques, and combinations of these and any other rendering or image processing techniques known in the art. In one embodiment, the display processor 112 includes a video retargeting system, as further described below, that is configured to receive an input image, compute a saliency map of the input image, compute horizontal and vertical resampling patterns based on the saliency map, and warping the image according to the resampling pattern. The resulting image may be transmitted by the video retargeting system to the display device 110.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
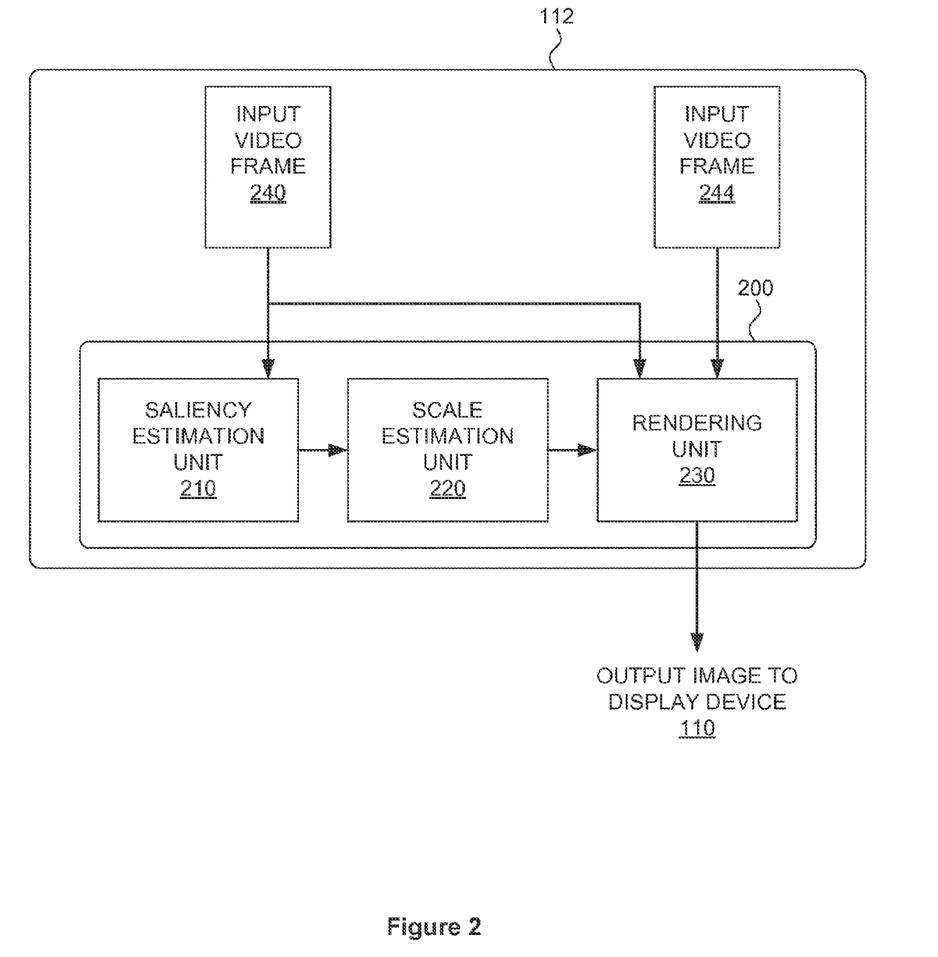
FIG. 2 illustrates a video retargeting system as implemented within the display processor of FIG. 1, according to one embodiment of the present invention.

FIG. 2 illustrates a video retargeting system 200 as implemented within the display processor 112 of FIG. 1, according to one embodiment of the present invention. As shown, the video retargeting system 200 includes a saliency estimation unit 210, a scale estimation unit 220, and a rendering unit 230. Note that the video retargeting system 200 pipelines the processing of the streamed video frames. Thus, every unit in the video retargeting system 200 contributes a certain latency to the overall system latency $L=L_{210}+L_{220}+L_{230}$, where $L_{210}$ is the latency of the saliency estimation unit, $L_{220}$ is the latency of the scale estimation unit, and $L_{230}$ is the latency of the rendering unit. As such, the video retargeting system 200 is configured to work in a pipelined manner. Therefore, if the current input image (i.e. video frame 240) is received at time k the resulting retargeted image at the output of the system will correspond to the input video frame received at time k-L.

The saliency estimation unit 210 computes a saliency map to determine the visually important portions of an input image. The saliency map is an image that highlights the portions of the input image that are generally held by human observers to be the visually important portions of the image. Typically, human observers focus more attention to portions of the image with distinctive features relative to the surroundings. For example, a salient image region may be a region with spatially concentrated and distinguished features. In one embodiment, such a saliency map may be computed by measuring one or more features of the input image, including, without limitation, edges associated with objects in the image, the color of objects in the image, and motion of objects in the image. For example, a saliency map could be created using a binary image wherein pixels set to "1" indicate salient regions while pixels set to "0" indicate non-salient regions. Any method known in the art for saliency map generation may be used for embodiments of this invention. At time k, the saliency estimation unit 210 receives an input video frame 240 k from the display processor 112, and sends an output image, representing a two-dimensional (2D) saliency map of input video frame 240 k-$L_{210}$, to the scale estimation unit 220.

Once the saliency map for an input image is calculated based on features such as edges, texture, disparity, color, or motion, the saliency map may be modified to account for the fact that human observers may pay more attention to the central portion of an image than to the portions of the image near the edges. In one embodiment, a perceptually motivated center bias may be added to the saliency map (or to its horizontal or vertical projections). Such a center bias may modify the values in the saliency map, for instance, by reducing the saliency map values located near the input image borders, while retaining the saliency map values near the center. Each of the saliency map values may be multiplied by a bias factor between zero to one. The bias factor may be equal to one for saliency map values corresponding to the center of the image. The bias factor may decrease toward zero as a function of distance from the center. In one embodiment, the center bias function may be implemented as a simple piece-wise linear function, where bias function for the middle 60% of the saliency profiles is a constant, and the bias function reduces the saliency profiles linearly over the first 20% and the last 20% of the saliency profiles.

The scale estimation unit 220 receives as input, the output image, representing a 2D saliency map of the input video frame 240 k-$L_{210}$, from the saliency estimation unit 210. (As discussed further below in conjunction with FIG. 7, the input image may be downsampled prior to computing the saliency map.) The scale estimation unit 220 computes a non-linear deformation based on the 2D saliency map, by first projecting it into one dimensional horizontal and vertical saliency vectors. Then, these 1D saliency vectors are nonlinearly scaled, resulting in horizontal and vertical scaling vectors enabling the mapping of content from the original image space to the target image space, as will be explained in detail below. Next, the horizontal and vertical scaling vectors are filtered to smooth out spatiotemporal fluctuations. In one embodiment, the horizontal and vertical scaling vectors may be filtered using acausal finite impulse response (aFIR) filters, including, without limitation, bilateral filters and Gaussian filters. The scale estimation unit 220 then sends the filtered and upsampled scaling vectors to the rendering unit 230.

The rendering unit 230 receives input video frames from the display processor 112, and the horizontal and vertical scaling vectors corresponding to the input video frames from the scale estimation unit 220. At time k, the rendering unit 230 receives the input image of frame k-$L_{210}$-$L_{220}$, where $L_{210}$ represents the latency of the saliency estimation unit 210 and $L_{220}$ represents the latency of the scale estimation unit 220. The rendering unit 230 retargets the input video frames 244 into the target image resolution. The rendering unit 230 may retarget the input video frames 244 using any technically feasible approach for image interpolation and anti-aliasing as is known in the art that performs forward mapping interpolation techniques, such as bilinear interpolation, Lanczos interpolation, linear interpolation, and kernel splatting, and anti-aliasing techniques, such as super-sampling, mip-mapping, and kernel splatting. In one embodiment, the rendering unit 230 may retarget the input image 244 using a non-linear distortion approach for interpolation and anti-aliasing called elliptical weighted average (EWA) rendering, which is also known as EWA splatting. EWA splatting implicitly handles anti-aliasing efficiently relative to at least some other techniques. The rendering unit 230 converts the one dimensional scaling vectors into a resampling grid that is then integrated to the EWA algorithm's formulation resulting in a simplified expression that allows for the efficient computation of the retargeted image. The retargeted image then is output to the display device 110.

Although described in the context of the display processor 112, the video targeting system 200 could be implemented in any technically feasible computing system, including, without limitation, embedded in a mobile device, in a computing device residing at the video source location, within an intermediate processing system, and on a general purpose computer. Details of the saliency estimation unit 210, the scale estimation unit 220, and the rendering unit 230 are further described in conjunction with FIGS. 3, 4, and 5, respectively.

Figure 3:
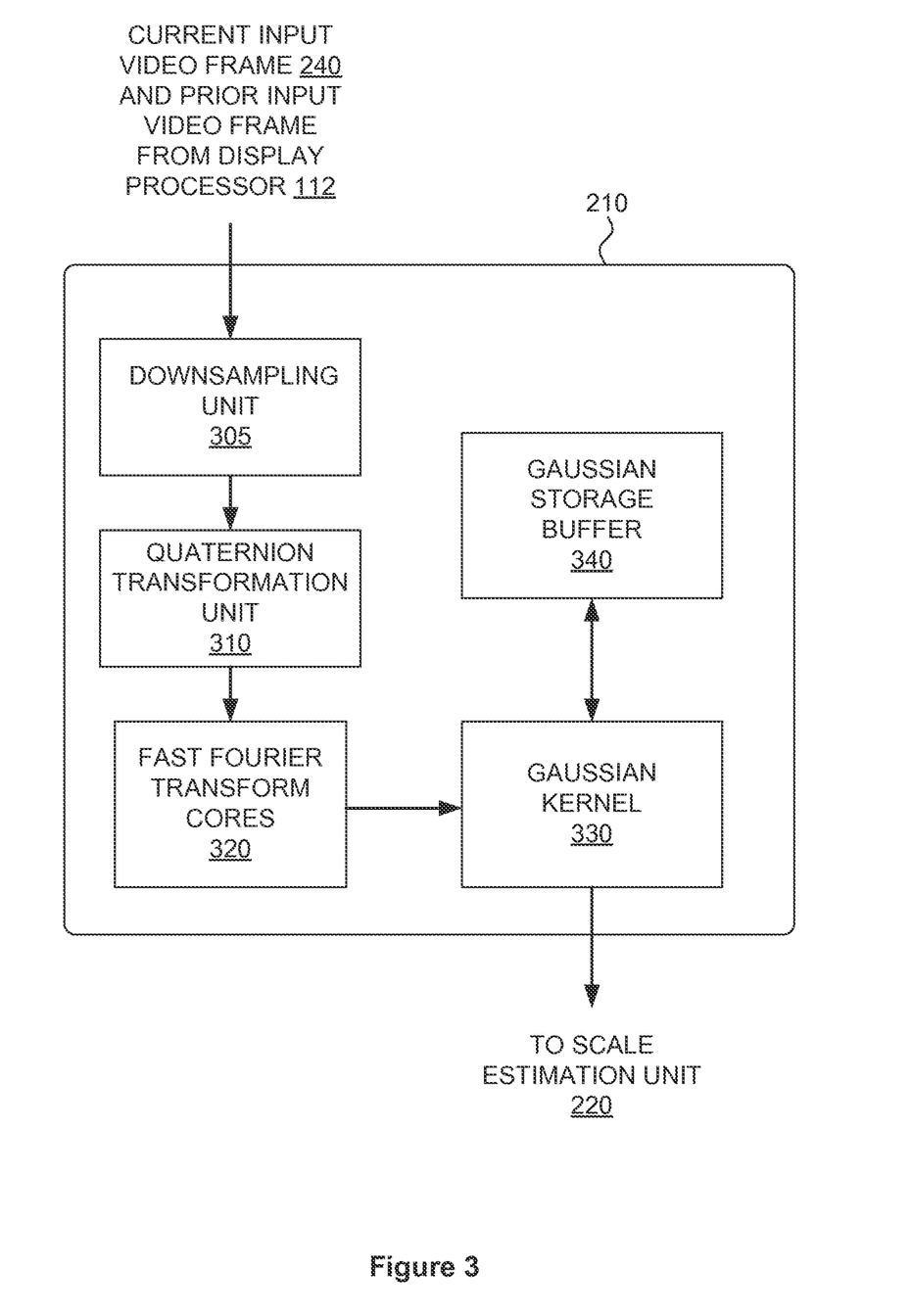
FIG. 3 illustrates the saliency estimation unit in the video retargeting system of FIG. 2, according to one embodiment of the present invention.

FIG. 3 illustrates the saliency estimation unit 210 in the video retargeting system 200 of FIG. 2, according to one embodiment of the present invention. As shown, the saliency estimation unit 210 includes a downsampling unit 305, a quaternion transformation unit 310, Fast Fourier Transform (FFT) cores 320, a Gaussian kernel 330, and a Gaussian storage buffer 340.

The downsampling unit 305 reduces the resolution of the input video frames 240 prior to saliency estimation, where the visually important portions of the image are determined. For example, an input image with resolution of 1080 horizontal lines of 1920 pixels each could be downsampled by a factor of four in the horizontal dimension and the vertical dimension. The resulting downsampled image would have a resolution of 270 horizontal lines of 480 pixels each. Although saliency estimation may be performed at higher image resolutions, estimation quality may not appreciably improve with increases in resolution. The downsampling unit 305 reduces the input resolution to a level where the quality of the saliency estimation remains high, but the amount of pixels to process is low relative to the full resolution of the input video frames 240.

The quaternion transformation unit 310 is an arithmetic unit that performs the first stage of the saliency estimation. In one embodiment, where the video image color is represented by an RGB color model, the RGB information is extended to include motion resulting in an RGBm representation. Motion information may be extracted from two successive input frames, for instance. Visual saliency may be obtained based on the phase spectrum of the input video sequence RGBm representation. The phase spectrum of an input video sequence may then be determined by performing a quaternion Fourier transform (QFT) on the RGBm information. The quaternion transformation unit 310 transforms the RGBm information from the input video sequence into a quaternion representation, where each quaternion representation includes a complex number with four components.

The FFT cores 320 perform the next step in the saliency estimation by completing the QFT operation. The FFT cores 320 receive the quaternion representation from the quaternion transformation unit 310. The FFT cores 320 transforms the quaternion representation into the frequency domain by performing the QFT. In the frequency domain, the fast FFT cores may extract the phase information by normalizing each quaternion with the magnitude of the quaternion, in one embodiment. The FFT cores 320 transform the extracted phase information back into the image domain via an inverse QFT. Typically, the QFT can be efficiently calculated using two separate 2D fast Fourier transforms (FFTs), one quaternion FT and one inverse quaternion FT, which may be realized using four one-dimensional (1D) FFTs and four 1D inverse FFTs. However, because the input video frames 240 are downsampled to a low-resolution image by the downsampling unit 305, the data rate needed by the FFT cores 320 is reduced significantly. As a result, the four 1D FFTs and four 1D inverse FFTs may be computed sequentially using two 1D FFT cores 320. An FFT buffer (not shown) within the FFT cores may store intermediate FFT results while they are computed sequentially. In this way, the QFT computation, and thus, the phase spectrum extraction, are accomplished using a relatively simple arithmetic data path.

Each of the two 2D FFT calculations described above is computed by first performing a 1D FFT on the rows of the input image (the quaternion representation of the RGBm information), followed by a 1D FFT on the columns of the resultant rows' 1D FFT. Typically, such an operation involves a matrix transposition, which may be costly in terms of memory bandwidth, particularly if the 2D input image array does not fit entirely in the available memory. To address this issue, saliency estimation may be performed on blocks within the input image, where each block includes a portion or sub-image of the entire image. In one embodiment, each of the blocks spans the full width of the input image, but with only a portion of the rows of the input image. As a result, the saliency computation may be performed on all sub-images individually, avoiding the need to perform a matrix transposition on the full image data. The number of blocks may be chosen depending on the size of the available memory for the given implementation. With such an approach, certain objectionable artifacts may be observed at the boundaries between adjacent blocks. These artifacts may be reduced by overlapping the individual blocks. Such an overlapping technique may reduce artifacts with only a slight increase in computational complexity. Because a global QFT over the entire image is not performed, all blocks are normalized individually, and, therefore, the overall saliency scale of the image is not preserved, potentially resulting in scaling errors. Therefore, after performing the QFT, the FFT cores normalize each block by the mean frequency magnitude of the block in order to reduce such scaling errors.

The Gaussian kernel 330 applies a spatial Gaussian blur to the output of the FFT cores 320 to remove high frequency noise from the saliency estimation. The saliency map may be spatially low pass filtered, using a 2D Gaussian kernel using a suitable variance. In one embodiment, the 2D Gaussian kernel uses a variance of 5.8. Although a direct 2D Gaussian filter may be computationally expensive, certain efficiencies may be realized because of the properties of a Gaussian filter. First, because a 2D Gaussian filter is dimensionally separable, two 1D Gaussian filters may be performed, one for the horizontal dimension and one for the vertical dimension, rather than a direct 2D Gaussian filter. Second, as is known in the art, under the central limit theorem, a 1D Gaussian filter may be approximated via a series of 9-pixel wide box filters, where such a series of box-filters may converge to a Gaussian filter. Such box filters are efficiently realized by using a 9-tap accumulation delay line followed by a subtraction unit. Further, four box filters are sufficient to achieve a reasonable approximation of a 1D Gaussian filter with a variance of 5.8.

The Gaussian storage buffer 340 stores the horizontally filtered image before the Gaussian kernel 330 filters in the vertical dimension. In one embodiment, the Gaussian storage buffer 340 includes storage for 32 horizontal lines of the horizontally filtered image, supporting storage for two consecutive blocks of approximately 16 lines each. The final Gaussian-filtered values are then normalized for each block using the sum of the absolute quaternion values computed by the quaternion transformation unit 310. The Gaussian kernel 330 of the saliency estimation unit 210 outputs a saliency map to the scale estimation unit 220.

Figure 4:
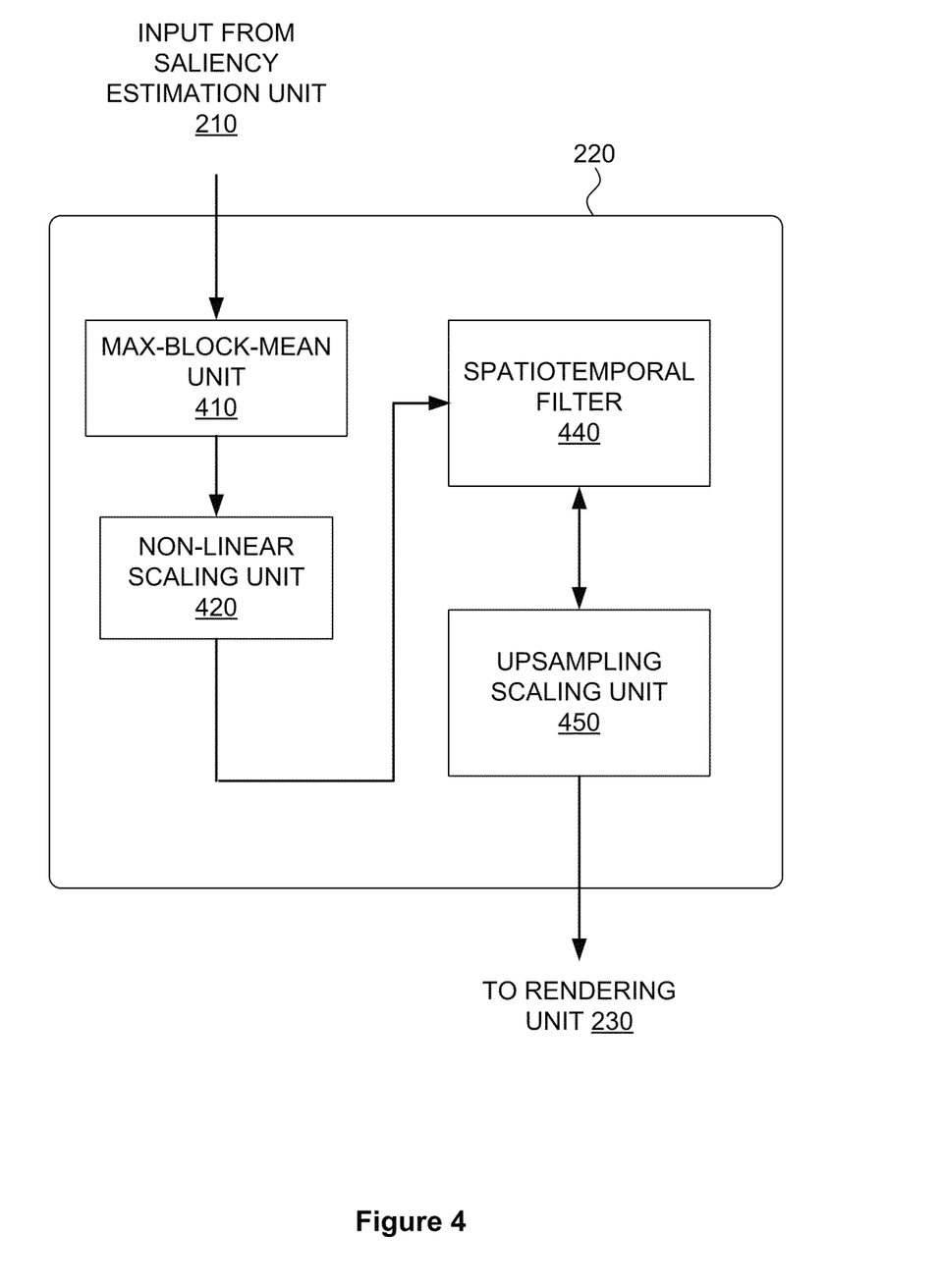
FIG. 4 illustrates a scale estimation unit in the video retargeting system of FIG. 2, according to one embodiment of the present invention.

FIG. 4 illustrates a scale estimation unit 220 in the video retargeting system 200 of FIG. 2, according to one embodiment of the present invention. As shown, the scale estimation unit 220 includes a max-block-mean unit 410, a non-linear scaling unit 420, a spatiotemporal filter 440, and an upsampling scaling unit 450.

The max-block-mean unit 410 projects the 2D saliency map received from the saliency estimation unit 210 into a horizontal and a vertical saliency profiles (vectors). The max-block-mean unit 410 calculates each element in the horizontal (vertical) saliency vector by evaluating each corresponding column (row) in the saliency map. For each corresponding column (row) the mean value of a sliding window is calculated and the maximum of these mean values is taken to be the projected saliency for that column (row). Two output buffers (not shown) store the current saliency vectors. An additional intermediate buffer (not shown) is utilized to perform the vertical saliency accumulation, since the input saliency may be streamed horizontally, in some embodiments. In some embodiments. The final saliency vectors are ready for additional processing as soon as the last saliency value of a frame is received by the mean-max-block unit 410.

The non-linear scaling unit 420 determines non-linear scaling factors used for computing the horizontal and vertical scaling vectors from the horizontal and vertical saliency vectors received from the mean-max-block unit 410. When the saliency vectors are ready, the non-linear scaling unit 420 begins a binary search for the non-linear scale factors. The non-linear scaling unit 420 performs the binary search iteratively until the search results reach a pre-defined error threshold.

Typically, this binary search is efficiently performed as compared with other units within the video retargeting system 200. In one embodiment, convergence to the error threshold is achieved within 10-15 iterations, each iteration of the binary search having a maximum duration of 512 cycles, where the downsampled video has a horizontal and vertical dimension of 512 pixels. After the non-linear scaling vectors are determined, the vectors may be stored in a temporary buffer (not shown) prior to sending the vectors to the spatiotemporal filter 440.

The spatiotemporal filter 440 is applied after the non-linear scaling computations described above to reduce spatiotemporal fluctuations in the output video resulting from high-frequency and low-frequency fluctuations in the saliency vectors. In one embodiment, the spatiotemporal filter 440 may include two 1D Gaussian filters, one each for filtering the horizontal scaling vectors and the vertical scaling vectors received from the non-linear scaling unit 420. In one embodiment, the spatiotemporal filter 440 may include an acausal finite impulse response (aFIR) filter to filter high-frequency content followed by an infinite impulse response (IIR) filter to filter low-frequency content. As further described below, one or more filter parameters may be set manually or automatically. In one embodiment, one or more filter parameters may be adapted automatically using image analysis tools to detect scene cuts, global camera motions, or static backgrounds, which may affect temporal filtering.

The upsampling scaling unit 450 performs linear upsampling on the filtered scaling vectors into the target output resolution.

The scale estimation unit 220 projects the 2D saliency map received from the saliency estimation unit 210 horizontally to create a 1D horizontal saliency profile. The 1D horizontal saliency profile indicates a single saliency value for each column of the input image. Likewise, the 1D vertical saliency profile indicates a single saliency value for each row of the input image. The 1D horizontal saliency profile and the 1D vertical saliency profile may be used to determine the importance of each row and column in the input image. In one example, high saliency values could be achieved even if there is only one small but very salient object in a given row or column. Adding more salient objects should not increase the saliency compared to just one salient object. In one embodiment, a block-wise mean computation of the saliency may be computed. To compute the horizontal saliency, each column of the input 2D saliency $S(x,y)$ may be partitioned into contiguous blocks $B_H = \{B_H^{(i)}\}$, in one embodiment. For each of these blocks, the mean saliency value is computed, and the maximum of all mean values is used as a 1D projection:

$$s_H(x) = \max_{\mathcal{B}_H^{(i)}} \left( \sum_{y \in \mathcal{B}_H^{(i)}} s(x,y) / \|\mathcal{B}_H^{(i)}\| \right) \quad \text{Equation 1}$$

where $S_H(x)$ represents the horizontal saliency profile, and the block size $\|B_H^{(i)}\|$ denotes the number of pixels contained in $B_H^{(i)}$. The vertical saliency profile is computed in a similar fashion.

Then, the scale estimation unit 220 computes a mapping from the 1D saliency profiles to a rectilinear resampling pattern. In order to retain the aspect ratio in important regions, the scale estimation unit 220 attempts to achieve a scaling vector that equals 1 in such areas, both in horizontal and vertical direction. The visually less important regions should have a scaling vector with a value <1 in the case of minifications (i.e., reducing the size of these input image regions), and a value >1 in the case of magnifications (i.e., increasing the size of these input image regions). In one example, the scale estimation unit 220 could achieve a scaling factor that is proportionately greater than or less than 1 as a function of the product of the vertical and horizontal saliency values from the 1D saliency profiles. In such a case, the scale estimation unit 220 could achieve a scaling factor of 1 in areas of the image where the product of the vertical and horizontal saliency values from the 1D saliency profiles is near 1. In addition, the sum of all elements of the scaling vector should match the requested target image size. In the following example, consider retargeting an input image of dimensions W×H to a target image of dimensions W'×H'. Due to the downscaling for the saliency computation, both widths and heights need to be downscaled accordingly for this computation.

Minification may be defined as the case where W'<W or H'<H. For minification, the desired scaling vector maps important regions to 1 and scales unimportant areas by values <1. In one embodiment, such a mapping is achieved by using the following equation:

$$f_k^{min}(\alpha) = \min(\alpha s_H(k), 1), \quad \text{Equation 2}$$

$$\text{s.t.} \sum_{k=1}^{W} f_k^{min}(\alpha) = W'$$

where $f_k^{min}(a)$ describes the horizontal scaling vector, and the vertical scaling vector is computed accordingly. Thus, the scale estimation unit 220 seeks to determine a value a that fulfills the above nonlinear optimization. Since $f_k^{min}(a)$ is a monotonically increasing function, a simple iterative approach is available that will always converge to the exact solution. A binary search quickly delivers the solution for a given precision value. In one embodiment, a precision threshold of $10^{-4}$ pixels is obtained within 10 to 15 iterations.

Magnification may be defined as the case where W'>W or H'>H. For magnification, visually less important regions should result in rescaling factors larger than 1. This can be done by mirroring the scaling vector function of equation 2 around the horizontal axis $f_k^{min}(a)=1$, resulting in $f_k^{mag}(a)=(2-f_k^{min}(a))$. Substituting this equation into equation 2 yields the following equation:

$$f_k^{mag}(\alpha) = 2 - \min(\alpha s_H(k), 1), \quad \text{Equation 3}$$

$$\text{s.t.} \sum_{k=1}^{W} f_k^{mag}(\alpha) = W'$$

The vertical scaling vector is computed in similar fashion. Note, that the equation above only supports individual pixel magnifications up to a scale of 2, but can easily be adapted for cases with larger aspect ratio differences.

After independently computing the horizontal and vertical scale vectors to match the output resolution W' and H', respectively, the horizontal and vertical scale vectors are combined.

In one embodiment, the horizontal and vertical scale computations are coupled using a target image size of W"×H" such that W"/H"=W'/H'. The additional degree of freedom (DoF) may then be chosen to distribute the non-linear distortions on both horizontal and vertical directions. The DoF may potentially be obtained with a coupled optimization.

In one embodiment only one of the nonlinear scaling vectors may be computed and used for the input image resampling. For example, only the horizontal scaling vector could be used, while a simple linear scaling could be used in the vertical direction.

The scaling vectors obtained from Equations 2 and 3 are directly related to the input saliency map. Therefore, high-frequency and low-frequency fluctuations in the saliency will directly lead to spatiotemporal fluctuations in the output video. In one embodiment, regularization is directly enforced by applying post filters after the non-linear scale computation. First, high-frequency content is removed using an acausal finite impulse response (aFIR) filter. The horizontal and vertical scaling vectors are collected over time (e.g., the most recent 10 input image frames), and each assembled in a separate matrix, called a spatiotemporal scaling matrix. At time k, each spatiotemporal scaling matrix includes horizontal and vertical scaling information for the input video frame k-$L_{210}$-$L_{220}$ and some number of previous input images. A 2D smoothing filter is applied to these spatiotemporal scaling matrices. The filter is acausal in the time domain in order to consider future changes in the scaling vectors. The aFIR filters may be of various types, including, without limitation, bilateral filters and Gaussian filters. Low-frequency content may be efficiently filtered in hardware, using an infinite impulse response (IIR) filter. With an IIR filter the cut-off frequency is not limited by the filter length, but by the filter coefficients. In one embodiment, a one-tap IIR filter may be utilized as represented by the following equation:

$$s_{out}[k] = as_{out}[k-1] + (1-a)s_{in}[k], 0 \leq a \leq 1 \quad \text{Equation 4}$$

where k corresponds to the time index. The filter coefficient a is largely dependent on the type of scene, and may be adapted to the video content. In some embodiments, the filter coefficient may be set manually, but the filter coefficient may also be adapted automatically using image analysis tools to detect certain conditions that affect temporal filtering including, without limitation, scene cuts, global camera motions, or static backgrounds.

Prior to generating the resampling grid, the scale estimation unit 220 linearly upsamples the horizontal and vertical scaling vectors to achieve the target resolution of the output image.

Figure 5:
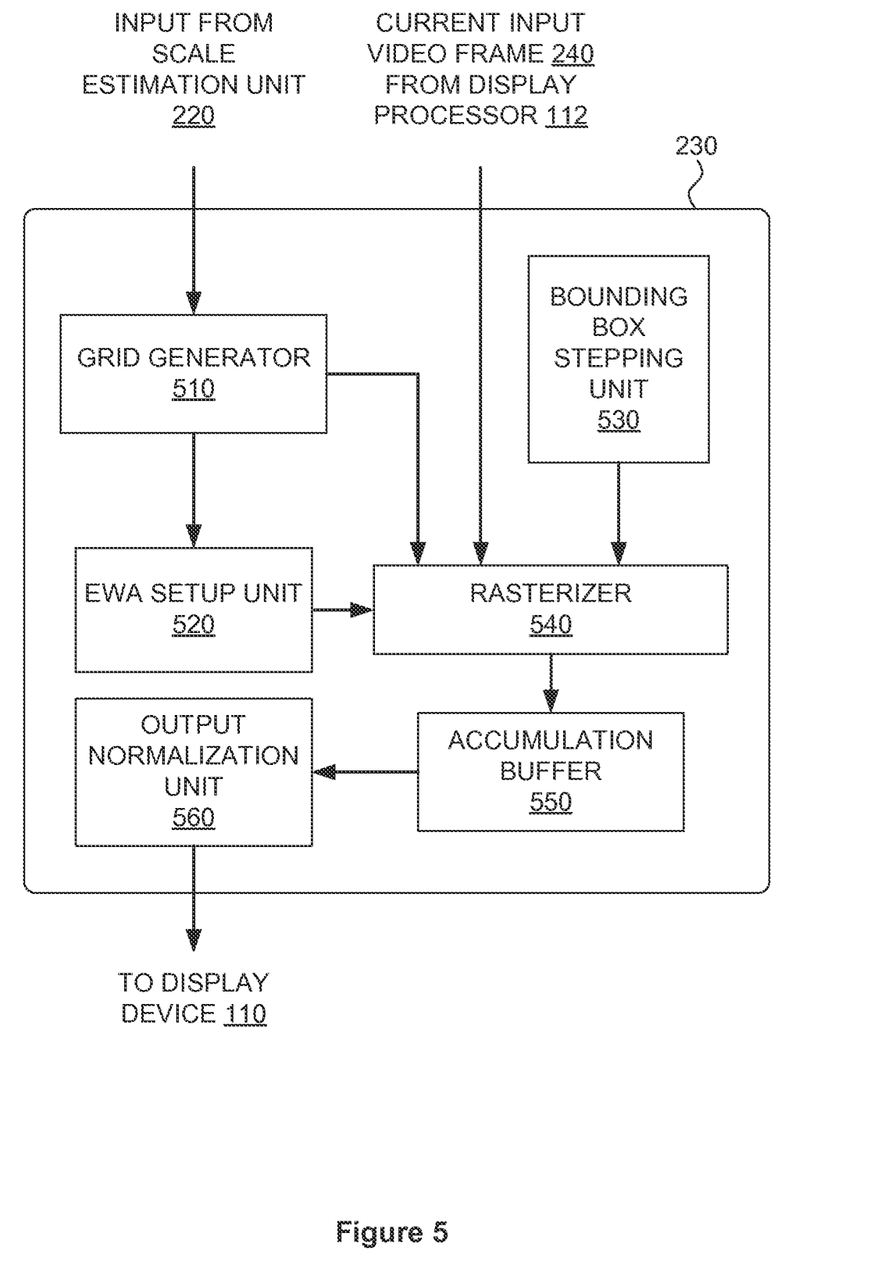
FIG. 5 illustrates a rendering unit in the video retargeting system of FIG. 2, according to one embodiment of the present invention.

FIG. 5 illustrates a rendering unit 230 in the video retargeting system 200 of FIG. 2, according to one embodiment of the present invention. As shown, the rendering unit 230 includes a grid generator 510, an EWA setup unit 520, a bounding box stepping unit 530, a rasterizer 540, an accumulation buffer 550, and an output normalization unit 560.

The grid generator 510 computes the transformation (resampling) grid to be used for retargeting the input video frames 244 based on the upsampled scaling vectors received from the scale estimation unit 220. The grid generator 510 sends the resulting transformation grid to the EWA setup unit 520 and the rasterizer 540.

The EWA setup unit 520 performs edge detection on the received image. In one embodiment, the EWA setup unit may use a 1D Sobel filter to compute the Jacobian determinant. The EWA setup unit 520 then computes the inverted diagonal terms of the covariance matrix resulting from the Sobel filter. The EWA setup unit 520 sends the resulting data to the rasterizer 540. In some embodiments, some of the matrix operations simplify to scalar operations due to absence of off-diagonal terms in the matrices.

The bounding box stepping unit 530 iterates over all pixels in the input image within each Gaussian filter's bounding box. The resulting sampling locations are sent to the rasterizer 540.

The rasterizer 540 receives the sampling locations, image data, and other data from the display processor 112, the grid generator 510, the EWA setup unit 520, and the bounding box stepping unit 530, and creates an output image in the target format. In one embodiment, the rasterizer 540 uses linear interpolation between the stored sampling points. Finally, the color channels of the image data are multiplied by the normalized filter value, and are then sent to the accumulation buffer 550.

The accumulation buffer 550 receives rasterized video data from the rasterizer 540 and holds the video data until the video data is streamed out to the display device 110. In one embodiment, the accumulation buffer 550 includes four separate on-chip static random access memory (SRAM) components, one for each even/odd—row/column combination. This configuration may simplify the assignment of sampling coordinates to the individual rasterizers 540, and allows the accumulation buffer 550 to accumulate four independent pixel contributions in parallel. Accesses to the accumulation buffer 550 may be realized with a read-accumulate-write operation. Data in the accumulation buffer 550 may be cleared after the data is read and sent to the display device 110. While the size of the accumulation buffer 550 may be reduced to the regular access patterns exhibited by the disclosed techniques, it should be known that the accumulation buffer 550 should be sized appropriately to accommodate frame-accurate video streaming to the display device 110.

The output normalization unit 560 performs a final output normalization of the output image based on the accumulated filter weight. Such a normalization is performed due to the interpolating nature of the Gaussian kernels described above in conjunction with FIGS. 3-4. The resulting output image is streamed directly to the display device 110.

The filtered and upsampled scaling vectors from the scale estimation unit 220 are converted to a resampling grid using a cumulative sum. In one embodiment, elliptical weighted average (EWA) resampling may be employed to retarget the input image. Such an approach may implicitly handle anti-aliasing efficiently. The rendering unit 230 may generate rectilinear deformations allowing for various simplifications, as further described below.

The EWA framework performs image resampling using forward mapping. In a first step, a continuous input signal is reconstructed using Gaussian kernels as interpolation filters. More specifically, each input pixel $w_k$ is represented by a circular 2D Gaussian reconstruction kernel with covariance matrix $V_i = \sigma_i^2 I_2$, where $\sigma_i^2$ notes the variance of the kernel and $I_2$ denotes the 2-by-2 identity matrix $$\begin{pmatrix} 1 & 0 \\ 0 & 1 \end{pmatrix}.$$

The reconstruction kernels are then transformed to target space, and low-pass filtered using a circular 2D Gaussian anti-alias kernel with covariance matrix $V_a = \sigma_a^2 I_2$. Finally, all kernels are evaluated and accumulated at the output pixel locations. This process is known as EWA splatting and may be defined by the following equation:

$$f_{EWA}(x) = \sum_{k \in D_s} \frac{w_k |J_k|}{2\pi |\Sigma|^{1/2}} e^{-\frac{1}{2}(x - m(u_k))^T \Sigma^{-1}(x - m(u_k))} \quad \text{Equation 5}$$

where $u_k$ is the spatial position of the pixel with index k in the source image $D_s$, and $w_k$ denotes the RGB value of the pixel. The image transformation function m(u) is defined by the resampling grid, and the Jacobian $J_k$ denotes the locally affine approximation of m(u). The covariance matrix of the target kernel is $\Sigma = J_k^T V_i J_k + V_a$.

For the techniques described herein, certain efficiencies may be achieved. For example, $J_k$ could be efficiently determined by using a Sobel filter evaluated on the output grid positions. Also, every input kernel will only be transformed by an axis-aligned non-uniform scaling matrix followed by a translation. Therefore, the off-diagonal elements of $J_k$ are always zero. This simplifies the overall computation, since $\Sigma = \sigma_i^2 J_k^2 + \sigma_a^2$ is diagonal. For the selection of $\sigma_i$ and $\sigma_a$, adaptive anti-aliasing may be used, which replaces $\Sigma$ with $\tilde{\Sigma}$, where $\tilde{\Sigma}$ is defined according to the following equation:

$$\tilde{\Sigma}(n, n) = \max(\sigma_a^2, \sigma_i^2 J_k^2(n, n)), n = 1, 2 \quad \text{Equation 6}$$

with $$\sigma_a = \sigma_i \approx 0.39.$$

Accordingly, the EWA rendering equations simplify to the following:

$$f_{EWA}(x) = \sum_{k \in D_s} c_k e^{-\frac{1}{2}(d_{k,1}^2 / \Sigma_{1,1} + d_{k,2}^2 / \Sigma_{2,2})} \quad \text{Equation 7}$$

with $$d_{k,i} := x(i) - m(u_k(i)),$$

and $$c_k = w_k \frac{|J_k|}{2\pi \sqrt{|\tilde{\Sigma}|}}, \quad \text{Equation 8}$$

$$c_k = w_k \frac{\min(1, J_k(1,1)) \min(1, J_k(2,2))}{2\pi \sigma_i^2}$$

Figure 6:
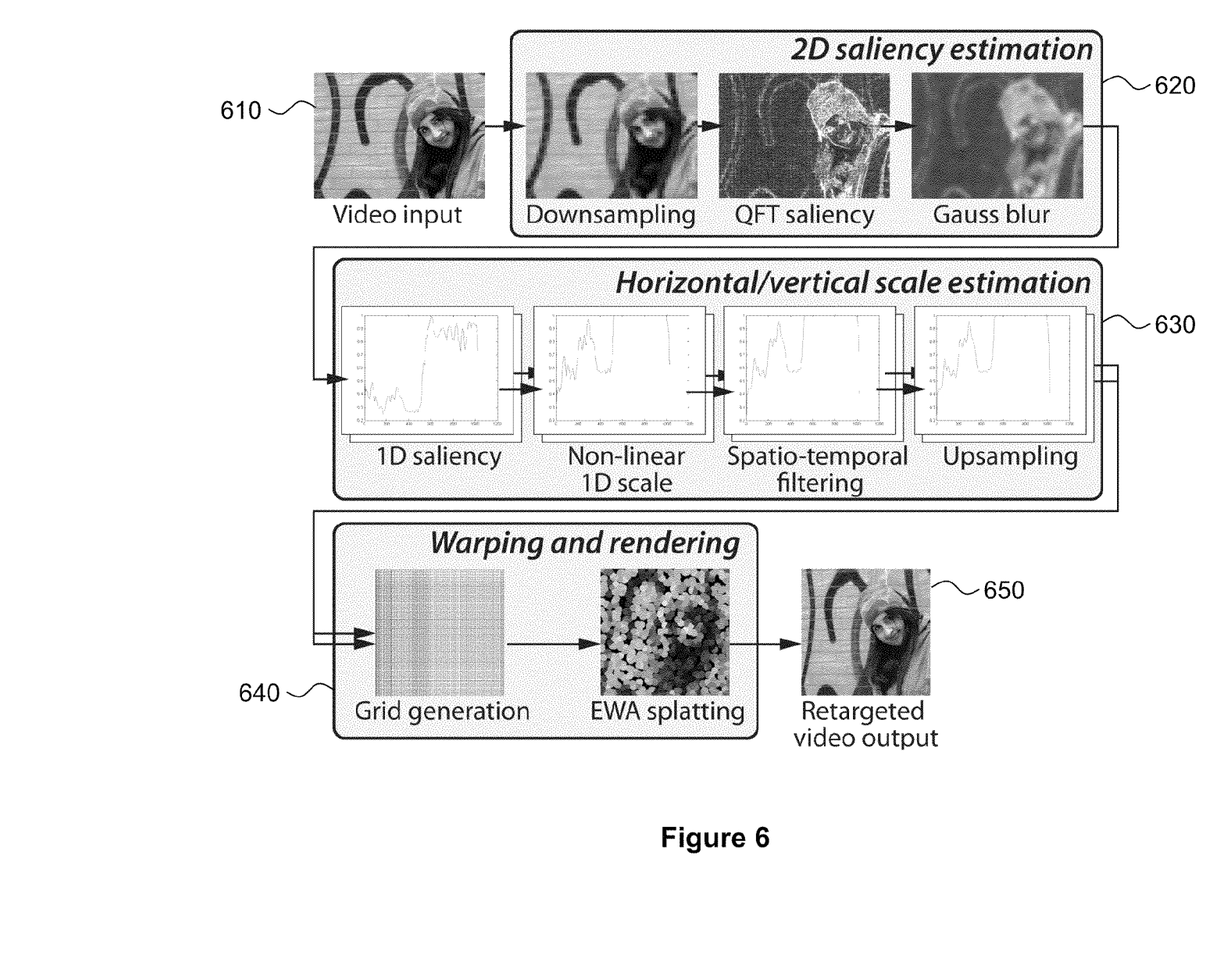
FIG. 6 illustrates an overview of the video retargeting technique as implemented in the video retargeting system of FIG. 2, according to one embodiment of the present invention.

FIG. 6 illustrates an overview of the video retargeting technique as implemented in the video retargeting system 200 of FIG. 2, according to one embodiment of the present invention. As shown, a video input image 610 is processed to produce a retargeted video output image 650. The video input image 610 first undergoes a 2D saliency estimation 620 followed by horizontal and vertical scale estimation 630. The video input image 610 then undergoes a warping and rendering process 640, thereby producing the retargeted video output image 650.

The 2D saliency estimation 620 includes three steps, according to one embodiment. In a first step the video input image is downsampled to produce an image with a lower resolution than the input image. In a second step, the downsampled image undergoes a QFT saliency test, where edge detection techniques are employed to distinguish the high saliency portions of the image from the low saliency portions. In a third step, the image is processed with a Gaussian blurring filter to remove artifacts from the QFT saliency step.

The horizontal and vertical scale estimation 630 includes four steps, according to one embodiment. In a first step, the 2D saliency map from the 2D saliency estimation 620 is projected separately onto a horizontal and a vertical 1D saliency profile. The projection onto the horizontal 1D saliency profile is used to determine the importance of each row in the image. The projection onto the vertical 1D saliency profile is used to determine the importance of each column in the image. In a second step, the horizontal and vertical saliency profiles are separately non-linearly scaled according to the relative saliency of each row or column of the image. In a third step, spatiotemporal filtering is applied to the profiles to reduce artifacts from the prior steps and to reduce artifacts related to discontinuities in adjacent frames in a video input sequence. In a fourth step, the horizontal and vertical saliency profiles are upsampled to the resolution of the retargeted video output image 650.

The warping and rendering process 640 includes two steps, according to one embodiment. In a first step, a 2D resampling grid is created based on the 1D saliency profiles computed during horizontal and vertical scale estimation 630. In a second step, the video input image 610 is mapped onto the 2D resampling grid using an EWA splatting technique, producing the retargeted video output image 650.

Figure 7:
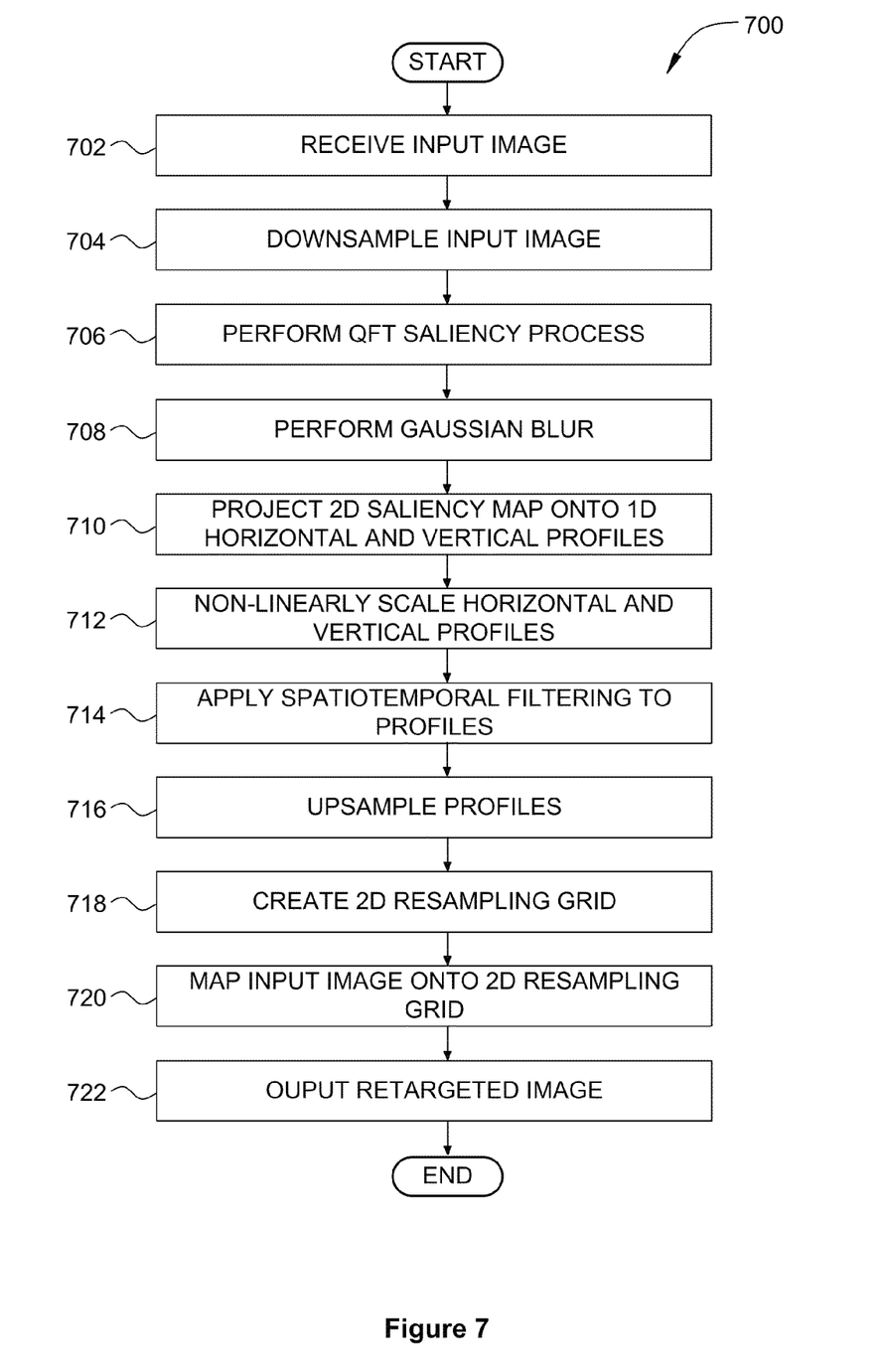
FIG. 7 illustrates a method for retargeting one or more input images, according to one embodiment of the present invention.

FIG. 7 illustrates a method 700 for retargeting one or more input images, according to one embodiment of the present invention. Although the method steps are described in conjunction with the systems of FIGS. 1-5, persons skilled in the art will understand that any system configured to perform the method steps, in any order, falls within the scope of the present invention.

The method 700 begins at step 702, where the video retargeting system 200 receives at least a portion of an input image that includes a plurality of picture elements (pixels). In an embodiment, the video retargeting system 200 receives a set of rows within the input image, where each row spans the width of the input image. At step 704, the video retargeting system 200 may downsample the input image, according to some embodiments.

At step 706, the video retargeting system 200 performs a QFT saliency process on the image to compute a 2D saliency map on at least a portion of the input image that distinguishes the relatively high saliency areas of the image from the relatively low saliency areas of the image. The 2D saliency map may include a plurality of saliency values where each saliency value of the plurality of saliency values represents relative importance of a corresponding pixel in the input image. In an embodiment, the video retargeting system 200 may compute the saliency map by applying a quaternion Fourier transform to the at least a portion of the input image, and applying a two-dimensional Gaussian blur to the at least a portion of the input image subsequent to applying the quaternion Fourier transform. In an embodiment, the video retargeting system 200 may further compute the saliency map by applying a quaternion Fourier transform to at least a portion of one or more previous input images. In some embodiments, the video retargeting system 200 may perform an alternative saliency mapping process, including, without limitation, analyzing the input image for image edges, variations in color, or motion of objects. In some embodiments, the video retargeting system 200 may modify the computed saliency map values to include, for example, a center bias by reducing each saliency value of the plurality of saliency values where the corresponding pixel is near one or more borders of the input image. The center bias may be applied to account for the fact that human observers may pay more attention to the central portion of an image than to the portions of the image near the edges.

At step 708, the video retargeting system 200 performs a Gaussian blur on the image. At step 710, the video retargeting system 200 projects the 2D saliency map from onto a horizontal and a vertical 1D saliency profile. At step 712, the video retargeting system 200 performing a non-linear scaling function on the horizontal and vertical saliency profiles separately according to the relative saliency of each row or column of the image to create a scaled horizontal saliency profile and a scaled vertical saliency profile. At step 714, the video retargeting system 200 applies spatiotemporal filtering to the profiles to reduce artifacts from the prior steps and to reduce artifacts related to discontinuities in adjacent frames in a video input sequence. In some embodiments, the video retargeting system 200 may apply spatiotemporal filtering to the scaled horizontal saliency profile and to the scaled vertical saliency profile to create a filtered horizontal saliency profile and a filtered vertical saliency profile. In some embodiments, the video retargeting system 200 may apply spatiotemporal filtering by adapting one or more filter parameters based on the existence of a scene cut, a global camera motion, or a static background.

At step 716, the video retargeting system 200 may upsample the horizontal and vertical saliency profiles to the resolution of the retargeted video output image, according to some embodiments. At step 718, the video retargeting system 200 creates a 2D resampling grid based on the 1D saliency profiles. At step 720, the video retargeting system 200 maps the video input image 610 onto the 2D resampling grid using an EWA splatting technique, producing the retargeted video output image. At step 722, the video retargeting system 200 creates an output image based on the scaled horizontal saliency profile. In some embodiments, the video retargeting system 200 may create the output image further based on the scaled vertical saliency profile. In some embodiments, the video retargeting system 200 may create the output image by computing a two-dimensional resampling grid based on the scaled horizontal saliency profile and the scaled vertical saliency profile, mapping the input image to the two-dimensional resampling grid to generate the output image, and sending the output image to a display device. The method 700 then terminates.

In sum, techniques are disclosed for retargeting video content, including high definition (HD) video. The techniques include receiving one or more input images, computing a saliency map to determine one or more visually important features associated with the at least one input image, computing a horizontal resampling pattern and a vertical resampling pattern based on the saliency information, and warping the images according to the resampling patterns. The images are then transmitted to, for example, a target display device with a different aspect ratio than the input images. Areas of low saliency are scaled non-uniformly while areas of high saliency are scaled uniformly. Temporal stability is achieved by filtering the horizontal resampling pattern and the vertical resampling pattern over time. In one aspect, retargeting video content is achieved with greater efficiency and lower compute power, resulting in a retargeting architecture that may be implemented in a circuit suitable for mobile applications such as mobile phones and tablet computers.

Various embodiments of the invention may be implemented as a program product for use with a computer system. The computer system may be any device suitable for practicing one or more embodiments of the present invention, including, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC). The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for retargeting an input image, the computer-implemented method comprising:
    receiving the input image comprising a plurality of pixels;
    computing a two-dimensional saliency map based on at least a portion of the input image;
    projecting the two-dimensional saliency map in at least one of a first direction to create a horizontal saliency profile and a second direction to create a vertical saliency profile;
    scaling at least one of the horizontal saliency profile and the vertical saliency profile non-linearly to create at least one of a scaled horizontal saliency profile and a scaled vertical saliency profile;
    computing a two-dimensional resampling grid based on at least one of the scaled horizontal saliency profile and the scaled vertical saliency profile; and
    creating an output image based on the two-dimensional resampling grid.

2. The computer-implemented method of claim 1, wherein the scaling comprises:
    applying spatiotemporal filtering to the at least one of the scaled horizontal saliency profile and the scaled vertical saliency profile to create at least one of a filtered horizontal saliency profile and a filtered vertical saliency profile.

3. The computer-implemented method of claim 2, wherein applying spatiotemporal filtering comprises adapting one or more filter parameters based on the existence of a scene cut, a global camera motion, or a static background.

4. The computer-implemented method of claim 1, wherein creating the output image comprises:
using an elliptical-weighted-average splatting technique to map the input image, based on the two-dimensional resampling grid, in order to generate the output image.

5. The computer-implemented method of claim 1, wherein computing the two-dimensional saliency map comprises:
applying a quaternion Fourier transform to the at least a portion of the input image; and
applying a two-dimensional Gaussian blur to the at least a portion of the input image subsequent to applying the quaternion Fourier transform.

6. The computer-implemented method of claim 1, further comprising:
downsampling the at least a portion of the input image; and
upsampling the at least one of the horizontal saliency profile and the vertical saliency profile.

7. A non-transitory computer-readable storage medium including instructions that, when executed by a processor, cause the processor to perform an operation to retarget an input image, the operation comprising:
receiving the input image comprising a plurality of pixels;
computing a two-dimensional saliency map based on at least a portion of the input image;
projecting the two-dimensional saliency map in at least one of a first direction to create a horizontal saliency profile and a second direction to create a vertical saliency profile;
scaling at least one of the horizontal saliency profile and the vertical saliency profile non-linearly to create at least one of a scaled horizontal saliency profile and a scaled vertical saliency profile;
computing a two-dimensional resampling grid based on at least one of the scaled horizontal saliency profile and the scaled vertical saliency profile; and
creating an output image based on the two-dimensional resampling grid.

8. The non-transitory computer-readable storage medium of claim 7, wherein the scaling comprises:
applying spatiotemporal filtering to the at least one of the scaled horizontal saliency profile and the scaled vertical saliency profile to create at least one of a filtered horizontal saliency profile and a filtered vertical saliency profile.

9. The non-transitory computer-readable storage medium of claim 8, wherein applying spatiotemporal filtering comprises adapting one or more filter parameters based on the existence of a scene cut, a global camera motion, or a static background.

10. The non-transitory computer-readable storage medium of claim 7, wherein creating the output image comprises:
using an elliptical-weighted-average splatting technique to map the input image, based on the two-dimensional resampling grid, in order to generate the output image.

11. The non-transitory computer-readable storage medium of claim 7, wherein computing the two-dimensional saliency map comprises:
applying a quaternion Fourier transform to the at least a portion of the input image; and
applying a two-dimensional Gaussian blur to the at least a portion of the input image subsequent to applying the quaternion Fourier transform.

12. The non-transitory computer-readable storage medium of claim 7, wherein the operation further comprises:
downsampling the at least a portion of the input image; and
upsampling the at least one of the horizontal saliency profile and the vertical saliency profile.

13. A computing system, comprising:
a memory that is configured to store instructions for a program; and
a processor that is configured to execute the instructions for the program to retarget an input image, by performing an operation that includes:
receiving the input image comprising a plurality of pixels;
computing a two-dimensional saliency map based on at least a portion of the input image;
projecting the two-dimensional saliency map in at least one of a first direction to create a horizontal saliency profile and a second direction to create a vertical saliency profile;
scaling at least one of the horizontal saliency profile and the vertical saliency profile non-linearly to create at least one of a scaled horizontal saliency profile and a scaled vertical saliency profile;
computing a two-dimensional resampling grid based on at least one of the scaled horizontal saliency profile and the scaled vertical saliency profile; and
creating an output image based on the two-dimensional resampling grid.

14. The system of claim 13, wherein the scaling comprises:
applying spatiotemporal filtering to the scaled, horizontal and vertical saliency profiles in order to create a filtered horizontal saliency profile and a filtered vertical saliency profile;
wherein creating the output image comprises:
using an elliptical-weighted-average splatting technique to map the input image, based on the two-dimensional resampling grid, in order to generate the output image;
wherein applying spatiotemporal filtering comprises adapting one or more filter parameters based on the existence of each of: (i) a scene cut; (ii) a global camera motion; and (iii) a static background.

15. The system of claim 14, wherein computing the two-dimensional saliency map comprises:
applying a quaternion Fourier transform to the at least a portion of the input image;
applying a two-dimensional Gaussian blur to the at least a portion of the input image subsequent to applying the quaternion Fourier transform; and
applying a quaternion Fourier transform to at least a portion of one or more previous input images;
wherein the operation further comprises:
downsampling the at least a portion of the input image; and
upsampling the at least one of the horizontal saliency profile and the vertical saliency profile.

16. The system of claim 15, wherein the two-dimensional saliency map comprises a plurality of distinct saliency values, wherein each saliency value of the plurality of saliency values represents relative importance of a corresponding pixel in the at least a portion of the input image;
wherein the at least a portion of the input image comprises a plurality of rows within the input image, wherein each row within the plurality of rows spans the width of the input image;
wherein the operation further comprises:
applying a center bias to the horizontal saliency profile and the vertical saliency profile by reducing each saliency value of the plurality of saliency values where the corresponding pixel is near one or more borders of the input image;
wherein the program comprises a video retargeting program that includes a saliency estimation unit, a scale estimation unit, and a rendering unit;

wherein the saliency estimation unit includes a downsampling unit, a quaternion transformation unit, a plurality of fast Fourier transform cores, a Gaussian kernel, and a Gaussian storage buffer.

17. The system of claim 16, wherein the two-dimensional saliency map is projected in each of: (i) the first direction to create the horizontal saliency profile and (ii) the second direction to create a vertical saliency profile;
wherein the horizontal saliency profile comprises a horizontal saliency vector, wherein the vertical saliency profile comprises a vertical saliency vector;
wherein the scaled horizontal saliency profile comprises a horizontal scaling vector, wherein the scaled vertical saliency profile comprises a vertical scaling vector;
wherein the output image is created based on the scaled, horizontal and vertical saliency profiles;
wherein by using the scaled, horizontal and vertical saliency profiles, the input image is retargeted more efficiently than using linear scaling and more efficiently than using letter-boxing;
wherein the scale estimation unit includes a max-block-mean unit, a non-linear scaling unit, a spatiotemporal filter, and an upsampling scaling unit;
wherein the rendering unit includes a grid generator component, an elliptical weighted average setup unit, a bounding box stepping unit, a rasterizer component, an accumulation buffer, and an output normalization unit.

18. The system of claim 17, wherein the horizontal saliency profile is given by a first predefined equation comprising:

$$S_H(x) = \max_{B_H^{(i)}} \left( \sum_{y \in B_H^{(i)}} s(x,y) / \|B_H^{(i)}\| \right)$$

wherein the operation further includes at least one of:
minifying a first region of the input image based on a first horizontal scaling vector given by a second predefined equation comprising:

$$f_k^{min}(\alpha) = \min(\alpha S_H(k), 1), \text{ s.t.} \sum_{k=1}^{W} f_k^{min}(\alpha) = W^i; \text{ and}$$

magnifying a second region of the input image based on a second horizontal scaling vector given by a third predefined equation comprising:

$$f_k^{mag}(\alpha) = 2 - \min(\alpha S_H(k), 1), \text{ s.t.} \sum_{k=1}^{W} f_k^{mag}(\alpha) = W^i.$$

19. The system of claim 18, wherein the spatiotemporal filtering includes applying: (i) an acausal finite impulse response filter in order to filter high-frequency saliency fluctuations, followed by (ii) an infinite impulse response filter in order to filter low-frequency saliency fluctuations;
wherein the infinite impulse response filter is applied according to a fourth predefined equation comprising:

$$s_{out}[k] = a s_{out}[k-1] + (1-a) s_{in}[k], 0 \le a \le 1 \quad \text{Equation 4}$$

wherein the input image is retargeted using elliptical-weighted-average splatting performed according to a fifth predefined equation comprising:

$$f_{EWA}(x) \sum_{k \in D_s} \frac{w_k |J_k|}{2\pi |\Sigma|^{1/2}} e^{-\frac{1}{2}(x-m(u_k))^T \Sigma^{-1}(x-m(u_k))}$$

wherein the elliptical-weighted-average splatting includes adaptive anti-aliasing performed according to a sixth predefined equation comprising:

$$\tilde{\Sigma}(n,n) = \max(\sigma_a^2, \sigma_l^2 J_k^2(n,n)), n=1, 2$$

wherein the fifth predefined equation is simplifiable to a seventh predefined equation comprising:

$$f_{EWA}(x) = \sum_{k \in D_s} c_k e^{-\frac{1}{2}(d_{k,1}^2/\Sigma_{1,1} + d_{k,2}^2/\Sigma_{2,2})}$$

wherein $C_k$ is given by an eighth predefined equation comprising:

$$c_k = w_k \frac{\min(1, J_k(1,1)) \min(1, J_k(2,2))}{2\pi \sigma_l^2}$$

20. The system of claim 13, wherein the operation further includes at least one of:
upon determining that a first region of the input image satisfies a criterion pertaining to visual importance, minifying the first region based on a first horizontal scaling vector; and
upon determining that a second region of the input image satisfies the criterion pertaining to visual importance, magnifying the second region based on a second horizontal scaling vector;
wherein the operation further includes:
upon determining that a third region of the input image satisfies the criterion pertaining to visual importance, preserving a size of the third region in the output image and relative to the input image;
wherein the first, second, and third regions are distinct regions in the input image.

* * * * *